United States Patent [19]

Kohno

[11] Patent Number: 4,688,859
[45] Date of Patent: Aug. 25, 1987

[54] DECELERATION-BALANCE TYPE BRAKE PRESSURE CONTROL VALVE ASSEMBLY

[75] Inventor: Teruhisa Kohno, Itami, Japan

[73] Assignee: Sumitomo Electric Industries, Ltd., Osaka, Japan

[21] Appl. No.: 757,534

[22] Filed: Jul. 22, 1985

[30] Foreign Application Priority Data

Jul. 27, 1984 [JP] Japan .................. 59-157854

[51] Int. Cl.$^4$ .............................................. B60T 8/26
[52] U.S. Cl. ................................. 303/6 C; 303/24 A; 303/24 C; 303/24 F
[58] Field of Search ............... 303/24 A, 24 R, 24 C, 303/24 F, 24 B, 24 BB, 6 C, 6 R, 84 A, 84 R, 87, 22, 23; 188/195, 349, 356

[56] References Cited

U.S. PATENT DOCUMENTS

| | | | |
|---|---|---|---|
| 3,163,473 | 12/1964 | Stelzer | 303/24 F X |
| 3,377,108 | 4/1968 | Eddy | 303/24 C |
| 4,253,707 | 3/1981 | Takata | 303/24 F X |
| 4,314,731 | 2/1982 | Farr | 303/24 A |
| 4,452,494 | 6/1984 | Kadota | 303/24 A X |

FOREIGN PATENT DOCUMENTS

| | | |
|---|---|---|
| 4731070 | 10/1972 | Japan . |
| 2010996 | 7/1979 | United Kingdom . |
| 2051275 | 1/1981 | United Kingdom . |
| 2082705 | 3/1982 | United Kingdom . |

Primary Examiner—Douglas C. Butler
Attorney, Agent, or Firm—Harness, Dickey & Pierce

[57] ABSTRACT

An improved deceleration-balanced type brake pressure control valve assembly is proposed which balances the input pressure with the output pressure and the control pressure proportional to the deceleration to control the output pressure supplied to the brakes. The control fluid pressure is regulated by a regulator in accordance with the deceleration. A brake fluid pressure detector is provided to detect the increase of the brake fluid pressure, opening a shutoff valve. While not braking, the shutoff valve remains closed, so that the control pressure is kept at zero.

21 Claims, 3 Drawing Figures

DECELERATION-BALANCE TYPE BRAKE PRESSURE CONTROL VALVE ASSEMBLY

The present invention relates to a deceleration-balanced type brake pressure control valve assembly which controls the output brake pressure by maintaining balance among the deceleration that occurred during braking with the brake input pressure and the brake output pressure throughout during braking for optimizing the distribution of braking force.

Deceleration-sensitive brake pressure control valves are known which seals with an inertia valve the brake fluid upon the occurrence of a predetermined deceleration and uses the sealed pressure to control what is called the split point at which the reduction of the input pressure is started. Over the linkage type pressure control valves which detect the amount of displacement in height of the pallet resulting from change in the live load with respect to the axis of the rear wheels to control the split point accordingly, the deceleration-sensitive pressure control valves have several advantages: less limitation to the place for installation, no necessity of fine adjustment during the vehicle assembly, and less change with time of the input/output pressure characteristics due to change with time of the suspension unit. However, they have the following disadvantages:

(1) The sealed pressure obtained at an early stage of control determines the output pressure during the entire period of braking. Therefore, if an abnormal pressure is sealed at sudden braking, the output pressure will be kept out-of-order throughout braking.

(2) Change in the sealed pressure with change in the live load has to be amplified to obtain a considerably large change in the split point. With this, the change in the sealed pressure due to various causes such as the application rate of the brake fluid pressure, fluid drag, manufacturing error of the control valve, etc, is also amplified. This increases the error in controlling the split point.

In order to solve these problems, the applicant proposed in Japanese Patent Laid-open Publication No. 47-31070 a control valve assembly for obtaining a desired output brake pressure during the entire period of braking by maintaining a balance among the input brake pressure, output brake pressure and the inertia force obtained by the deceleration acting on an inertia body. However, such a control valve assembly requires a considerably large inertia body to balance the fluid pressure with the inertia force if the brake fluid pressure is applied from a master cylinder.

Also, British patent Nos. 2010996A, 2051275A and 2082705A proposed a control valve assembly which is provided with a control fluid pressure adjuster including an inertia body for detecting the deceleration to produce a control pressure proportional to the deceleration by balancing the inertia force acting on the inertia body with the pressure of a control fluid other than the brake fluid, instead of balancing the inertia force directly with the input and output brake pressures, and controls the output pressure by comparing the control pressure with the input and output pressures throughout the braking.

However, such prior art control valve assemblies have the following shortcomings. In regulating the pressure of control fluid supplied from a source of pneumatic or vacuum pressure to obtain a control pressure proportional to the deceleration, it is necessary to keep the control pressure at zero while not braking and increase it in proportion to the deceleration after starting braking. For this purpose, these prior art control valve assemblies adopt a means for applying a bias to the control fluid pressure regulator to keep the control pressure at zero. But, with this method, the response or the size of inertia body has to be sacrificed because the regulation of pressure of control fluid is started only after the inertia force acting on the inertia body has become larger than the bias.

British patent No. 2010996A, for example, has an embodiment in which vacuum pressure is used as the control fluid and the force of two coil springs and the pressure difference across a shutoff valve separating the atmospheric pressure from the vacuum pressure are used as the bias. On such a control valve, a very large inertia body is required to counteract such a large bias to insure good response. This makes the size of a control valve assembly unrealistic. To solve this problem, a pendulum mechanism having an inertia body is used to amplify the inertia force at a lever ratio. But, such a control valve assembly inevitably becomes bulky.

Another method proposed to solve this problem is to use the same fluid both as the brake fluid and as the control fluid to keep at zero the pressure of control fluid while not braking. However, since the pressure of control fluid has to be regulated to a value proportional to the deceleration, part of fluid has to be escaped into the air when the control pressure has become too high. Otherwise, an open system has to be adopted to return part of the fluid back to the tank to decrease the control pressure. Therefore, this method cannot be adopted to the closed circuit brake system which is now generally used for automobiles.

British patent No. 2082705A proposes a system which uses a control fluid different from the brake fluid, the pressure of the control fluid being proportional to the brake fluid pressure. Specifically, in the air-powered hydraulic brake system, fluid pressure from a hydraulic actuator is used as the brake fluid and air pressure supplied to the actuator is used as the control fluid. Another method is to use as the control fluid the pneumatic or vacuum pressure produced in the control chamber of a servo booster and proportional to the pedal treading force in the hydraulic brake system having an air-powered or vacuum-powered direct servo. This method has problems of poor response at sudden braking and poor reliability because many devices are relied on and because control pressure is firstly adjusted in the servo booster to a value proportional to the pedal treading force and then adjusted in the control fluid pressure regulator to a value proportional to the deceleration.

These prior art control valve assemblies have another problem. Particularly in sudden braking in which the input pressure increases rapidly, the build-up of the deceleration tends to delay in comparison with the increase of the input and output pressures owing to various causes such as the rigidity of suspension, elastic deformation of tyres, sliding resistance of the brake cylinders, and viscosity resistance of piping, etc. Thus, the output pressure temporarily becomes excessive with a result that the rear wheels might lock. Another cause of excessive output pressure is poor response of the control valve assembly itself. Such a rear wheel lock can be prevented by increasing the volume of the output side circuit to decrease the output pressure, in case of a closed circuit. However, this inevitably makes larger the size of the entire control valve assembly.

An object of the present invention is to provide a deceleration-balanced brake pressure control valve assembly which obviates the abovesaid shortcomings and which is compact in size and lightweight and has good response and reliability.

In accordance with the present invention, two pressure chambers are provided, the first one of which is connected through an inertia valve to a source of control fluid other than the brake fluid and the second one of which is connected directly to the source of control fluid. The pressure difference between these two pressure chambers is regulated by a control fluid pressure regulator to a control pressure proportional to the deceleration, the control pressure being compared with the input and output brake pressures. In the passage from the source of control fluid to the first or second pressure chamber, a shutoff valve is provided to control the communication through the passage so that only when the brake fluid pressure has increased, the shutoff valve will be opened to allow the control fluid pressure regulator to start regulation.

With this arrangement, while not braking, the shutoff valve serving as a brake pressure detector will be closed, so that the control fluid pressure regulator including an inertia valve will not operate. Therefore, the pressure difference between two chambers can be kept zero without the necessity of applying any additional bias. This decrease in the required bias allows miniaturization of the inertia valve. Upon braking, the shutoff valve will open to cause the first or second pressure chamber to communicate with the source of control fluid pressure so that the pressure difference between two pressure chambers will be regulated by the inertia force acting on the inertia valve, with a result that the output pressure depending on the deceleration will be supplied with satisfactory response.

Other objects and features of the present invention will become apparent from the following description taken with reference to the accompanying drawings, in which.

Figure 1:
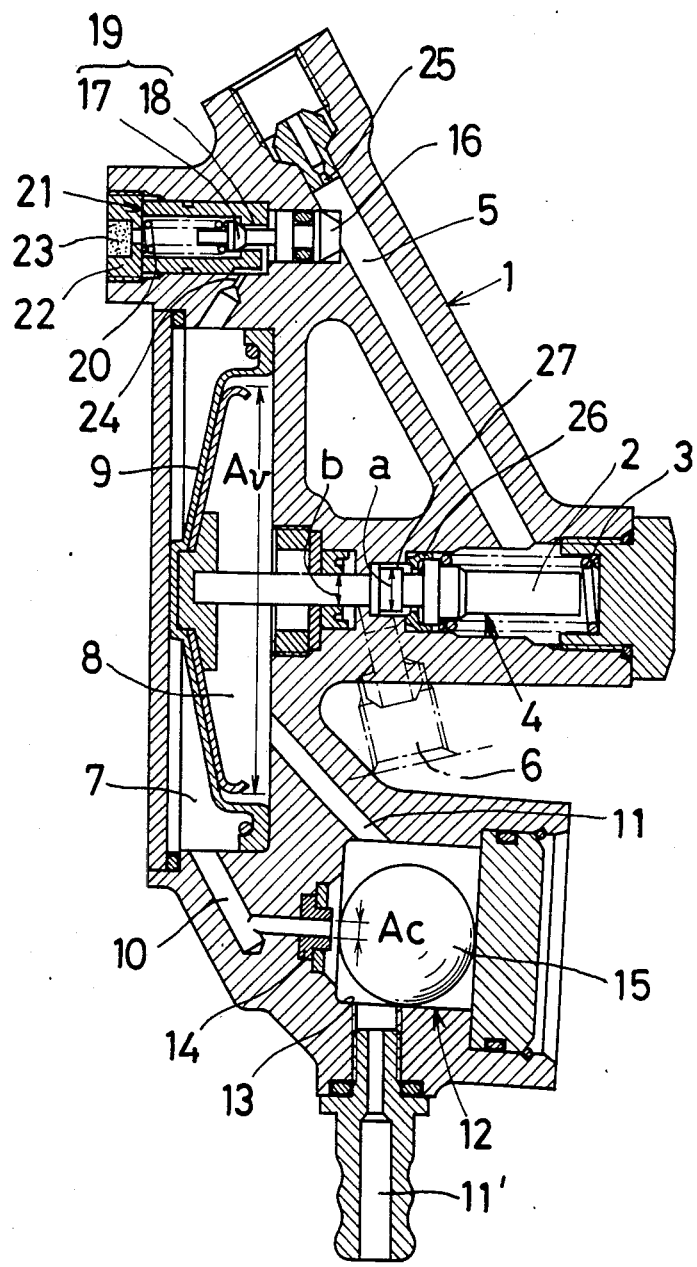
FIG. 1 is a sectional view of the first embodiment of the present invention.

The first embodiment shown in FIG. 1 comprises a valve body 1 having a central bore, a known pressure proportioning valve 4 mounted in the bore and having a plunger 2 and a spring 3 urging the plunger in a valve-opening direction for setting the split point. An inlet 5 is connected with a source of brake fluid, such as a master cylinder. Pressurized fluid is supplied through the inlet 5, passes through the proportioning valve 4 and is led to an outlet 6.

In front of the plunger 2 is provided a diaphragm type power piston 9 by which a first pressure chamber 7 is partitioned airtight from a second pressure chamber 8. The piston 9 has its output shaft butting against the front end of the plunger 2. Both of the pressure chambers 7 and 8 are connected to a source of vacuum (not shown) through passages 10, 11 and 11'. The passage 10 connecting to the first pressure chamber 7 is adapted to be closed by an inertia valve 12 which comprises a valve seat 14 and an inertia body 15 rolling on a front-up inclined surface 13 and butting against the valve seat 14 to close the passage 10 upon the occurrence of a certain degree of deceleration. This ball type inertia valve may be replaced with a pendulum type inertia valve. The inclined surface 13 may not be front-up but front-down.

At the upper part of the valve body, there is a brake pressure detector 21 which comprises a piston 16 having one end disposed in the inlet 5, a shutoff valve 19 composed of a valve body 17 integral with the piston 16 and a fixed valve seat 18, and a spring 20 urging the valve body 17 in a valve-closing direction. This shutoff valve 19 opens and closes a passage which has one end connected to an air inlet 23 formed by inserting a porous plug into a plug 22 and the other end connected through a throttle 24 to the first pressure chamber 7.

The inertia valve 12 and the throttle 24 form a control fluid pressure regulator which serves to apply to the plunger 2 a pressure proportional to the deceleration. The second pressure chamber 8, connected to the vacuum source not through the inertia valve 12, is always under the same pressure as in the vacuum source. Into the first pressure chamber 7, air is led through the throttle 24 after the shutoff valve 19 has been opened. Thus, some balance is maintained between the inertia force acting on the inertia body 15 and the pressure difference between the first and second pressure chambers acting on the seal diameter of the fixed valve seat 14, so that the pressure difference will be controlled to a value proportional to the deceleration. The size of the throttle 24 is determined in view of the speed of exhaust from the vacuum source and the seal diameter of the fixed valve seat 14.

While not braking, the inertia valve 12 remains open and the shutoff valve 19 is closed because of zero pressure of the brake fluid through the inlet 5. Thus, an equal vacuum pressure acts on both sides of the power piston 9 biassed through the plunger 2 by the spring 3, so that the output of the piston will be kept at zero.

When braking is started, the pressure of the brake fluid is increased enough to press the piston 16 leftwardly, so that the shutoff valve 19 will be opened and air flow through the throttle 24 into the first pressure chamber 7. Simultaneously deceleration will occur so that the inertia valve 12 will be closed. Thus, some pressure difference will develop between the first and second pressure chambers. The difference depends upon the inertia force acting on the inertia body 15, the flow rate of air through the throttle 24 into the first pressure chamber and the speed of exhaust from the vacuum source. The output of the power piston 9 resulting from the pressure difference is applied to the plunger 2 to control the output pressure.

As the deceleration increases, the output of the piston increases to move the plunger 2 rightwardly until its valve head 27 butts against the lip seal 26, closing the proportioning valve 4 to start the pressure reduction. In this state, the forces acting on the plunger 2 from both sides can be expressed as follows:

$$Pf\cdot A + F = Pr\cdot B + Pv\cdot Av \qquad (1)$$

wherein
Pf: Input pressure
Pr: Output pressure
A: Cross-sectional area (=a) of surface on the plunger which receives the input pressure
B: Cross-sectional area (=a−b) of surface on the plunger which receives the output pressure p1 F: Force of spring 3
Pv: Pressure difference between first and second pressure chambers
Av: Effective sectional area of the power piston 9 which receives the pressure difference Pv Also, balance of the forces acting on the inertia body 15 can be expressed as follows:

$$Pv \cdot Ac = \omega a \cos\theta - \omega \sin\theta \quad (2)$$

wherein
- $Ac$: Effective pressure-receiving area of the inertia value
- $\omega$: Weight of the inertia body
- $\theta$: Gradient of the inclined surface 13
- $a$: Deceleration Also, the following equation holds good from the relationship between the brake fluid pressure and the deceleration:

$$W \cdot a = Pf \cdot Cf + Pr \cdot Cr - Fo \quad (3)$$

wherein
- $W$: Weight of vehicle
- $Cf$: brake constant of front wheel brakes
- $Cr$: brake constant of rear wheel brakes
- $F_o$: Sum of the pressure losses of the front and rear wheels at rise-up multiplied by their brake constants Eliminating Pv and $\alpha$ from the equations (1), (2) and (3), $$Pr = \frac{\left(A - \frac{Av}{Ac} \cdot \frac{\omega}{W} \cos\theta \cdot Cf\right) Pf + F + \frac{Av}{Ac} \cdot \frac{\omega}{W} Fo \cdot \cos\theta + \frac{Av}{Ac} \omega \sin\theta}{B + \frac{Av}{Ac} \cdot \frac{\omega}{W} \cos\theta \cdot Cr} \quad (4)$$

The reducing ratio R can be expressed as follows:

$$R = \frac{A - \frac{Av}{Ac} \cdot \frac{\omega}{W} \cos\theta \cdot Cf}{B + \frac{Av}{Ac} \cdot \frac{\omega}{W} \cos\theta \cdot Cr} \quad (5)$$

Substituting $Pf = Pr = Ps$ into the equation (4) to determine the split point Ps which is the point of intersection with the straight line $Pf = Pr$, $$Ps = \frac{F + \frac{Av}{Ac} \omega \left(\sin\theta + \frac{Fo}{W} \cos\theta\right)}{B - A + \frac{Av}{Ac} \cdot \frac{\omega}{W} \cos\theta \cdot (Cf + Cr)} \quad (6)$$

Up to the cut-in point determined by the equation (6), the output pressure will be kept equal to the input pressure. After the cut-in point, the input pressure will be reduced at the reduction ratio expressed by the equation (5). Because $Fo \cos\theta/W$ is normally very small, the equations (5) and (6) mean that the increase in the vehicle weight W causes the increase in not only the split point but also in the reducing ratio. Further, the deceleration $as$ at the occurrence of the split point can be expressed as follows by making $Ps = Pf = Pr$ in the equation (3) and substituting the value in the equation (6), $$as = \frac{(Cf + Cr)\left\{F + \frac{Av}{Ac} \omega \left(\sin\theta + \frac{Fo}{W} \cos\theta\right)\right\}}{(B - A) W + \frac{Av}{Ac} \omega \cos\theta (Cf + Cr)} - \frac{Fo}{W} \quad (6')$$

Because Fo/W is normally very small, if A=B, the deceleration at the split point will be constant regardless of the vehicle weight. The larger the value A is than B, the more the deceleration at the split point increases as the vehicle weight increases. Therefore, generally A should be larger than B (for A=a, B=a−b) for better approximation to the ideal brake force distribution.

Since the pressures in two pressure chambers are equal to each other while not braking, Pv=O in the equation (2). Thus, the deceleration $ao$ at that time is equal to $\tan\theta$. Assuming that the deceleration $ao$ when the inertia valve 12 starts to operate is 0.05 g, $\theta = 2.86°$. Also, let us assume that the negative pressure at the vacuum source is 500 mmHg (=0.658 kg/cm$^3$). Because it is preferable that Pv becomes maximum when the deceleration is 1.0 g, substituting $\alpha = 1$, Pv=0.658 in the equation (6), $$W = 0.693 \, Ac \quad (7)$$

This shows that a small inertia body will do when the size of Ac is set to be small.

The throttle 25 is provided for the reason mentioned below. In this embodiment, the vacuum pressure used as the control fluid pressure firstly balances with the deceleration, thereafter with the input and output pressures from the master cylinder. If response is poor, in spike or abrupt braking, the output pressure could increase excessively, causing locking of the rear wheels, after which it decreases to a normal pressure by the function of the pressure proportioning valve 4 (in this embodiment the head 27 of the plunger 2 gets into the lip seal 26 to increase the volume of the output circuit and thus decrease the output pressure). The throttle 25 is provided to prevent such a locking by retarding the supply of fluid into the pressure proportioning valve 4 and avoiding a sharp increase of the output pressure. The throttle 25 should preferably be provided, but is not essential.

Figure 2:
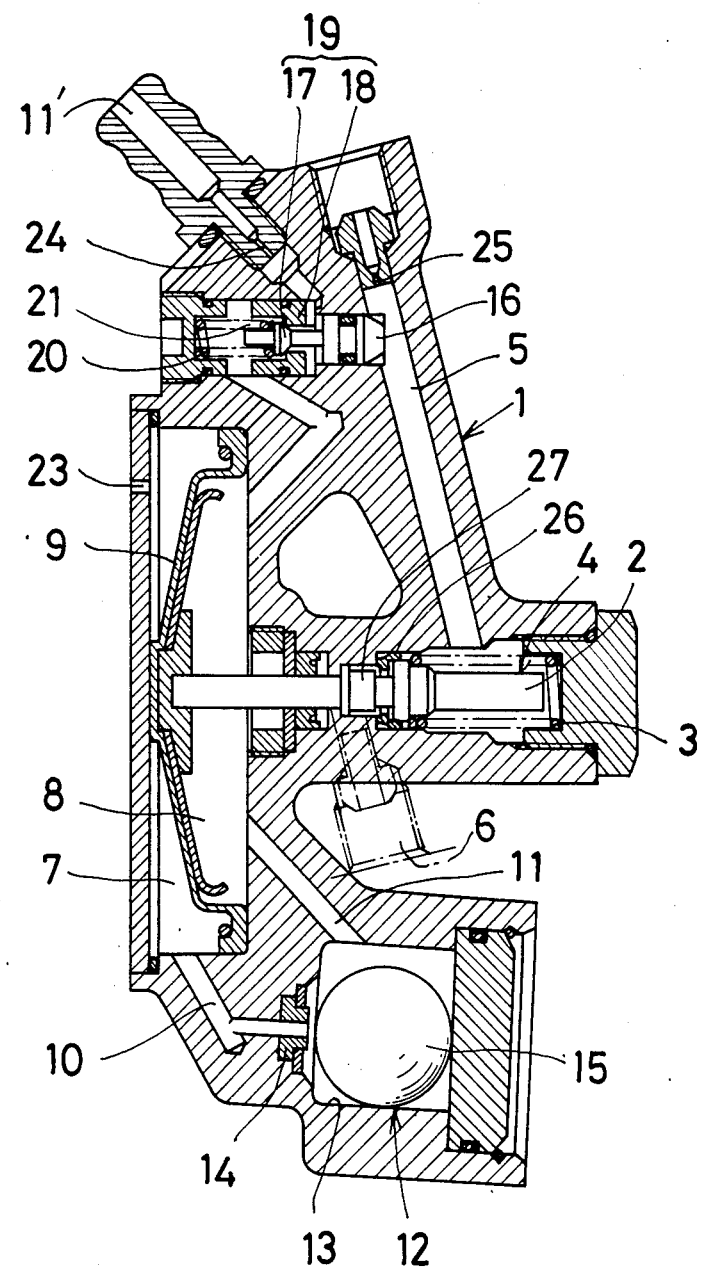
FIGS. 2 and 3 are similar sectional views of other embodiments.

The second embodiment shown in FIG. 2 differs from the first embodiment of FIG. 1 only in the following points. Firstly, the brake fluid pressure detector 21 is used to close the passage 11' connecting a vacuum source to the second pressure chamber 8. Secondly, the first pressure chamber 7 is provided with an air inlet 23 to keep it under the atmospheric pressure.

In the second embodiment, while not braking, both of the first and second pressure chambers 7, 8 are under the atmospheric pressure. So the output of the power piston 9 will be zero.

When brake is applied, the shutoff valve 19 will open whereas the inertia valve 12 will close. As in the first embodiment, the pressure difference between the first and second pressure chambers will be regulated to a value proportional to the deceleration. The pressure difference is applied through the power piston 9 to the plunger 2. With this embodiment, the equation (6) about the forces acting on the plunger 2 and the equation (2) about the forces acting on the inertia body 15 will hold good. The output pressure will be controlled in substantially the same manner as in the first embodiment.

Figure 3:
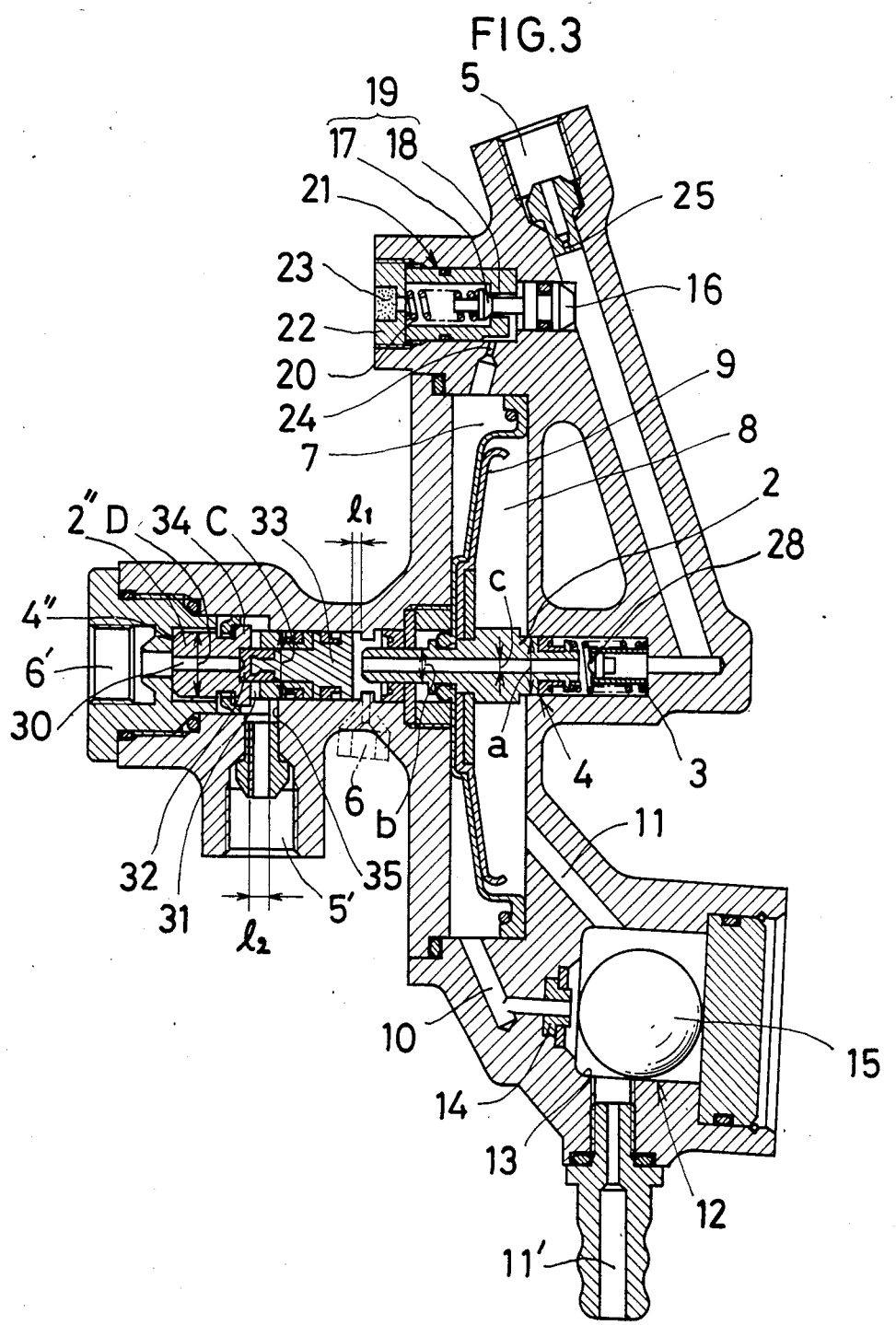

The third embodiment shown in FIG. 3 is a brake pressure control valve assembly for dual system which is suited for use with the diagonal split piping. In other words, this third embodiment is an adaptation of the first embodiment to a dual system brake pressure control valve assembly having a follower valve which follows the output pressure from a pressure proportioning valve in the first line to reduce the input pressure to the second line.

In the third embodiment, two inlets 5, 5' connected to a master cylinder are provided The pressure of fluid led through one of the inlets 5 is reduced by a pressure proportioning valve 4' which comprises the plunger 2' having a passage extending therethrough and urged by the power piston 9 and a poppet valve 28 adapted to butt against the righthand end of the plunger 2 to close the passage. The reduced fluid pressure is supplied through the outlet 6. The fluid led through the other inlet 5' is controlled by a follower valve 4", (known from Japanese patent application No. 56-173335) which comprises a plunger 2" having equal areas C and D to receive the output pressure of the second line and the output pressure of the first and second lines, respectively. The follower valve 4" serves to cause the plunger 2" to follow the movement of the plunger 2' so that the output pressure of the second line will be equal to that of the first line. As in the first embodiment, the brake fluid pressure detector 21 comprises the piston 16 having one end disposed in the passage connecting to one of the inlets 5, and the shutoff valve 19 interposed between the air inlet 23 and the first pressure chamber 7. In this embodiment, too, the inlet 5 is provided with a throttle 25.

In this embodiment, while both of the lines operate normally, the forces acting on the plunger 2' in the valve-opening direction, which are the input pressure plus the bias of the spring 3, balances with the forces acting on it in the valve-closing direction, which are the output pressure plus the thrust by the power piston 9. In this embodiment, the areas A and B on which the input and output pressures, respectively, act are as follows:

$$A = a - c, \ B = b - c$$

After the split point, when the pressure proportioning valve 4' starts to operate to reduce the input pressure of the first line at a reducing ratio proportional to the deceleration, the input pressure of the second line, too, is reduced to the same pressure as the output pressure of the first line, since the area C is equal to the area D on the plunger 2" of the second line and the plunger 2' receives on its each end the same pressure.

If the first line including the pressure proportioning valve 4' should fail, the output pressure of the first line will be zero, so that a bypass piston 33 will move toward the first line. In the normal state, the bypass piston 33 moves with the plunger 2" of the second line under the output pressure of the first line, closing with a bypass seal 32 bypasses 30, 31 connecting the input of the second line with its output. When the bypass piston 33 moves toward the first line, the bypasses 30, 31 will be open, so that the input pressure of the second line will be equal to its output pressure. Further, even if the pressure of the second line increases, the bypasses will not be closed again because a flange 34 on the plunger 2" will butt against a shoulder 35 on the valve body since $l_1 > l_2$.

If the second line should fail, both the cut-in point and the reduction ratio will increase drastically in comparison with the normal state, because the brake constants in the equations (5) and (6) will decrease to about half (because the brakes in the failed line do not work).

As in the first embodiment, the pressure difference between the first and second pressure chambers will be proportional to the deceleration because the first pressure chamber 7 is connected through the inertia valve 12 to a vacuum source.

Even if the second embodiment is adopted for the first line in the third embodiment, the same result will be obtained.

Although in the first to third embodiments a vacuum source is used as the second pressure source, a source of pneumatic pressure or hydraulic pressure above the atmospheric pressure may be connected to the air inlet in these embodiments with the port 11' open to the air. The same effect will be obtained.

In all of the abovesaid embodiments, the throttle 25 serves to delay the increase of the output pressure. Thus, even if the control pressure temporarily becomes lower than the desired value owing to delay of build-up of the deceleration, the output pressure will not become excessive.

The throttle 25 may be formed integrally with the valve body, or may be formed on the nipple for pipe connection for simpler construction of the valve body.

Although all of the embodiments are designed for hydraulic brake systems, the present invention is also applicable to other systems such as full air brake system and full power brake systems.

With the control valve assembly according to the present invention, while not braking, the passage of control fluid from its source to the first or second pressure chamber is closed by the brake fluid pressure detector, so that the control fluid pressure regulator will not operate. So the following advantages are obtained:

(1) The inertia valve can be compact in size because of a small bias acting on the inertia body.

(2) Because the control fluid pressure is regulated according to the inertia force acting on the inertia valve, the split point and the reduction ratio proportional to the vehicle weight can be set with a good response.

(3) The pressure of the control fluid is added to the plunger of the proportional valve as the thrust of the power piston. Thus, the construction is simple and the control valve assembly is compact in size.

(4) The control pressure is obtained from a source other than the source of brake fluid. This makes possible the adoption to the closed circuit type brake system.

Because a throttle is provided in a passage of the brake fluid, the rear wheel lock due to delay in the build-up of deceleration or delay of response in the control valve itself can be easily prevented without the need of increasing the size of control valve or complicating the construction.

What I claim:

1. A brake pressure control valve assembly for controlling an output pressure supplied from an operator source of brake working fluid to brakes by balancing an input pressure supplied from said source of brake working fluid with said output pressure and with a control pressure of control fluid supplied from a source of said control fluid and other than said brake working fluid, control fluid pressure regulating means for regulating said control pressure in proportion to the deceleration that occurred as a result of braking, said control fluid pressure regulating means including an inertia valve, said control valve assembly comprising a brake fluid pressure detecting means for causing said control fluid pressure regulating means to start regulation of said control fluid control pressure only when the brake working fluid pressure has increased to a predetermined level.

2. A brake pressure control valve assembly as claimed in claim 1, wherein said control fluid pressure regulating means comprises a first pressure chamber connected through said inertia valve to said source of said control fluid and a second pressure chamber connected directly to said source of said control fluid, said regulated control pressure comprising the pressure difference between said first pressure chamber and said second pressure chamber, and a shutoff valve disposed in a passage from said source of control fluid to one of said pressure chambers for blocking the communication through said passage to said one of said pressure chambers, said brake fluid pressure detecting means being operated to open said shutoff valve only when the brake working fluid pressure has increased to a predetermined level so that said control fluid pressure regulating means will start regulation.

3. A brake pressure control valve assembly as claimed in claim 2, wherein said brake fluid pressure detecting means has a piston urged by the brake fluid pressure toward said shutoff valve, for opening said shutoff valve.

4. A brake pressure control valve assembly as claimed in claim 2, wherein said source of control fluid is a source of vacuum, said second pressure chamber being connected directly to said source of vacuum, said first pressure chamber being connected to an air inlet through said shutoff valve.

5. A brake pressure control valve assembly as claimed in claim 2, wherein said source of control fluid is a source of vacuum, said first pressure chamber being connected directly to air, said second pressure chamber being connected to said source of vacuum through said shutoff valve.

6. A brake pressure control valve assembly as claimed in claim 2, wherein said source of control fluid is a source of fluid at a pressure higher than the atmospheric pressure, said first pressure chamber being connected to atmospheric pressure, said second pressure chamber being connected to said source of control fluid through said shutoff valve.

7. A brake pressure control valve assembly as claimed in claim 2 wherein said source of control fluid is a source of fluid at a pressure higher than the atmospheric pressure, said second pressure chamber being connected directly to said source of pressure higher than atmospheric pressure, said first pressure chamber being connected to air through said shutoff valve.

8. A brake pressure control valve assembly as claimed in claim 1, wherein said brake working fluid is fed from its source in two lines, said brake working fluid pressure detecting means being arranged to detect the pressure of brake fluid in only one of said lines.

9. A brake pressure control valve assembly as claimed in claim 1, wherein said inertia valve comprises a ball shaped inertia body rolling on a surface and a valve seat against which said inertia body butts.

10. A brake pressure control valve assembly as claimed in claim 1, wherein a throttle is provided in a passage through which the brake fluid flows.

11. A brake pressure control valve assembly as claimed in claim 3, wherein said source of control fluid is a source of vacuum, said second pressure chamber being connected directly to said source of vacuum, said first pressure chamber being connected to an air inlet through said shutoff valve.

12. A brake pressure control valve assembly as claimed in claim 3, wherein said source of control fluid is a source of vacuum, said first pressure chamber being connected directly to air, said second pressure chamber being connected to said source of vacuum through said shutoff valve.

13. A brake pressure control valve assembly as claimed in claim 3, wherein said source of control fluid is a source of fluid at a pressure higher than the atmospheric pressure, said first pressure chamber being connected to atmospheric pressure, said second pressure chamber being connected to said source of control fluid through said shutoff valve.

14. A brake pressure control valve assembly as claimed in claim 3, wherein said source of control fluid is a source of fluid at a pressure higher than the atmospheric pressure, said second pressure chamber being connected directly to said source of control fluid, said first pressure chamber being connected to atmospheric pressure through said shutoff valve.

15. A brake pressure control valve assembly as claimed in claim 2, wherein said brake fluid is fed from its source in two lines, said brake working fluid pressure detecting means being arranged to detect the pressure of brake working fluid in only one of said lines.

16. A brake pressure control valve assembly as claimed in claim 3, wherein said brake fluid is fed from its source in two lines, said brake working fluid pressure detecting means being arranged to detect the pressure of brake working fluid in only one of said lines.

17. A brake pressure control valve assembly as claimed in claim 4, wherein said brake working fluid is fed from its source in two lines said brake fluid pressure detecting means being arranged to detect the pressure of brake working fluid in only one of said lines.

18. A brake pressure control valve assembly as claimed in claim 2, wherein said inertia valve comprises a ball shaped inertia body rolling on a surface and a valve seat against which said inertia body butts.

19. A brake pressure control valve assembly as claimed in claim 3, wherein said inertia valve comprises a ball shaped inertia body rolling on a surface and a valve seat against which said inertia body butts.

20. A brake pressure control valve assembly as claimed in claim 3, wherein a throttle is provided in a passage through which the brake working fluid flows.

21. In a deceleration-balanced brake pressure control valve assembly comprising a source of brake working fluid, a source of control fluid other than said brake working fluid, an inertia valve having an inertia body, a first pressure chamber connected through said inertia valve to said source of control fluid, a shutoff valve disposed in a passage for control fluid for blocking the communication through said passage, a control fluid pressure regulating means comprising said inertia valve for regulating the difference in pressure between said first pressure chamber and said second pressure chamber to a value proportional to the deceleration that occurred as a result of braking, a power piston partitioning between said first pressure chamber and said second pressure chamber, and adapted to move in response to said difference in pressure, a valve means for controlling a passage connecting an inlet of brake working fluid from said source of brake working fluid with an outlet thereof, an axially slidable plunger for controlling said valve means, a spring means urging said plunger in a valve-opening direction, said plunger being acted upon by the brake working fluid pressure at said inlet and the bias of said spring means in a valve-opening direction and acted upon by the brake working fluid pressure at said outlet and the thrust by said power piston acted upon by said difference in pressure in a valve-closing direction, the improvement further comprising a brake fluid pressure detecting means for detecting said input pressure and keeping said shutoff valve open during a priod while said input pressure exceeds the detected value and is increasing, so that said control fluid pressure regulating means performs regulation during said period.

* * * * *

UNITED STATES PATENT AND TRADEMARK OFFICE
CERTIFICATE OF CORRECTION

PATENT NO. : 4,688,859

DATED : August 25, 1987

INVENTOR(S) : Teruhisa Kohno

It is certified that error appears in the above-identified patent and that said Letters Patent is hereby corrected as shown below:

Column 1, line 43, "controi" should be --control--.

Column 4, line 63, delete "pl F".

Column 4, line 64, before "Force" insert --F:--.

Column 7, line 9, after "provided" insert a period (--.--).

Column 7, line 18, after "56-173335" insert
--published as Japanese Patent Publication 58-73462
on April 30, 1983--.

Column 7, line 49, " 2' " should be --2''--.

Column 9, line 56, Claim 8, delete "working"

Column 9, line 58, Claim 8, after "brake" insert --working--.

Column 10, line 25, Claim 15, after "brake" insert --working--.

Column 10, line 30, Claim 16, after "brake" insert --working--.

Column 10, line 36, Claim 17, after "lines" insert a comma (--,--).

UNITED STATES PATENT AND TRADEMARK OFFICE
CERTIFICATE OF CORRECTION

PATENT NO. : 4,688,859

DATED : August 25, 1987

INVENTOR(S) : Teruhisa Kohno

It is certified that error appears in the above-identified patent and that said Letters Patent is hereby corrected as shown below:

Column 10, line 36, Claim 17, after "brakes" insert --working--.

Column 12, line 3, Claim 21, "pricd" should be --period--.

Signed and Sealed this

Third Day of May, 1988

Attest:

*Attesting Officer*

DONALD J. QUIGG

*Commissioner of Patents and Trademarks*